3,171,799
PROCESS FOR THE DEMINERALIZATION OF WATER
George W. Batchelder, 205 Washington Ave., Santa Monica, Calif.
No Drawing. Filed Aug. 28, 1962, Ser. No. 220,055
14 Claims. (Cl. 210—22)

The present invention relates to the process of demineralizing water. More particularly, the present invention relates to such a process in which osmosis of pure water through a semi-permeable membrane is induced.

It has been proposed to demineralize saline waters by distillation, by evaporation, and by electrode dialysis. Each of these processes requires the application of large amounts of external energy and thus are not commercially feasible for large scale operations such as preparing fresh water from saline waters, which includes sea water, saline ground waters, prepared aqueous solutions or waste waters, resulting from commercial, industrial or residential activities. It has also been proposed to demineralize water by various freezing processes, but the cost of such processes has been found to be prohibitive.

The long standing need for an inexpensive process for the demineralization of water, particularly sea water, is of course, well known. The present invention provides such a process.

It is an object of the present invention to provide a process for the demineralization of water which is inexpensive.

It is another object of the present invention to provide a process for the demineralization of water which does not require the application of large amounts of energy.

It is a further object of the present invention to provide a process for the demineralization of water in which a solute functions to promote the migration of pure water, i.e., water which does not contain a substantial amount of salts, through a membrane.

It is still another object of the present invention to provide a process for the demineralization of water wherein a volatile solute is used to promote the migration of pure water, i.e., water containing substantially no salts, through a membrane from a saline solution into a solution containing the solute and removing the solute from the solution after a desired amount of migration has taken place.

Other objects and advantages of the present invention will be apparent from the following detailed description thereof.

Briefly, the present invention comprises the use of a system in which two bodies of saline water, e.g., sea water, are separated by a semi-permeable membrane. A volatile solute, e.g., sulfur dioxide is then added to one of the bodies of water. The addition of the volatile solute causes pure water, i.e., water containing substantially no salts, to migrate through the membrane from the solution which does not contain the solute into the solution which does contain the solute, thereby diluting the solutes, including the salts, in the latter solution. This dilution process is continued until the desired concentration level of non-volatile salt is reached. This volatile solute is then removed. The membrane used in the practice of the present invention is preferably a cellulosic membrane. A system wherein the volatile solute comprises sulfur dioxide and the membrane comprises the mixture of cellulosic membranes which comprise a carrot root has been found particularly satisfactory. However, other suitable materials may be used.

It will immediately be apparent to those skilled in the art that the present invention is a rather radical departure from conventional demineralization processes in that the process of the invention functions to produce an extremely dilute solution of non-volatile salts which has a sufficiently low concentration thereof to be suitable for drinking, production of steam, etc., rather than attempting to merely remove salts from a single solution. The ultimate product in each case is, of course, essentially the same, the difference being that in conventional processes a single function is performed, viz., separation of as large an amount of salts as possible, whereas in the present invention two functions are performed, viz., separation of salt materials from water and dilution of salt containing solutions. However, the present invention is not limited to this two function system and may be practiced simply by using a system comprising a semi-permeable membrane having on one side thereof a saline solution and on the other side thereof a fresh water solution containing a volatile solute.

*Example 1*

A quantity of sea water was collected from Santa Monica Bay. Ammonia was bubbled through a 10 cc. portion of this sea water for a period of ten minutes. A membrane comprising a hollowed out carrot root was then filled with the ammoniated sea water. The carrot root was then closed with a stopper having a tube therein. This tube was generally U-shaped with one leg of the U being longer than the other. The longer leg was that which was inserted into the stopper. This assembly was then positioned such that the U of the tube was inverted with the legs being vertical. A receiver was placed under the shorter leg. The carrot root was then immersed in one gallon of untreated sea water. The ammoniated sea water passed through the tube and started dripping into the receiver in 6.5 hours. After 20 hours the dripping had stopped. Water, equal in volume to that originally placed inside the carrot root had collected in the receiver. Thus, the concentration of non-volatile salts in the total amount of water in the receiver and in the carrot root was approximately 50% of that in the original sea water.

*Example 2*

The same process as that described in Example 1 was carried with the exception that a saturated solution of sodium sulfite in fresh water was placed inside the carrot root and sea water was placed outside the root. Osmosis proceeded in the same manner as described in Example 1 and water started dripping into the receiver after 6.5 hours.

*Example 3*

The same process as that described in Example 1 was performed with the exception that the carrot root was filled with sea water through which sulfur dioxide had been bubbled to form a solution containing about 4% sulfur dioxide. In this case, dripping started after 16 hours and continued for four days. The sea water used in this example was also treated with one teaspoon per gallon of Lysol which functioned as a preservative for the carrot root.

Obviously, the concentration of non-volatile salts in a given solution may be decreased according to the present invention by providing a series of osmotic cells which will successively decrease the concentration in the manner previously described. When natural membranes, such as the carrot root used in the examples, are used in the present invention, it is desirable to condition such membranes to remove salts and sugars initially present therein by simply preparing a system comprising the membrane and untreated saline solution, i.e., containing no volatile solute, on each side thereof. This was done in each of the examples previously described for a period of 48 hours.

The process of the present invention is ideally suited for the desalinization of sea water. When the present invention is used for this purpose, it is preferred to use a solution of sulfur dioxide in sea water having a concentration of about 3.6% to about 7% to promote osmosis. After lowering the non-volatile salt concentration of the sulfur dioxide-containing sea water to a desired level according to the present invention, the sulfur dioxide may be removed by any suitable means. The precise method of removing the sulfur dioxide, or other volatile solute, does not form a part of this invention, but the combination of the removal of the volatile solute with the step of lowering the non-volatile salt concentration is an important feature of the present invention. Sulfur dioxide may be removed by a heated gas stripping operation in which the solution is passed downwardly through a stripping column counter-current to warm air. Water from which the sulfur dioxide has been removed flows from the bottom of the column and a sulfur dioxide-air mixture flows from the top. Such a stripping operation may be operated at 150° F. to 190° F. After giving up its heat to sea water in a heat exchanger, the effluent gas is passed into the bottom of an absorbing column counter-current to fresh cold sea water. Additional sulfur dioxide is supplied to the bottom of the absorbing column to make up the loss in the process. A sulfur burner may be used to provide this sulfur dioxide. The heat from this burner may be used to heat water which is used to warm the leg of the osmotic cell containing untreated, i.e., no volatile solute, sea water and may be used to heat the gas fed to the stripping column. It has been found that sulfur dioxide loss in the process may be held to about 3% of the sulfur dioxide present in the solution used in the osmotic cell, i.e., the sulfur dioxide loss is about 0.10% to about 0.20%. Thus, the operating expense involved in the practice of the present invention would consist essentially only of the cost of the replacement of the sulfur dioxide.

The choice of materials to be used in the present invention is controlled essentially only by a limited number of parameters. The membrane used may be virtually any water permeable membrane having pore sizes small enough to prevent substantial passage of the non-volatile salt which is to be separated from the water or of the volatile solute which is added to promote this separation. Conversely, the volatile solute is chosen such that it has a molecule size sufficiently large to prevent substantial passage through the membrane. The volatile solute should also have a high solubility in water and/or salt solutions. The volatile solute should also have a large change in vapor pressure with temperature to enhance its removal from the demineralized product obtained according to the practice of the present invention. Among the many types of membrane which would be suitable for use in the present invention, untreated, i.e., water permeable, cellulosic film, e.g., such as may be produced according to the cellulose xanthate process, film meeting the previously noted parameters is believed to be highly satisfactory. It will, however, be obvious to those skilled in the art that the choice of membrane will be, in part, determined by the choice of mineral-containing solution and of volatile solute and that a great variety of membranes may be used in the present invention. In addition to the volatile solutes previously mentioned, it is believed that methyl acetate and acetonitrile are among the most satisfactory for use in the present invention. Again, it is to be understood that the present invention is not limited to particular volatile solutes other than those which meet the previously noted parameters. Furthermore, although sulfur dioxide is believed to be most satisfactory for use in the present invention to accomplish commercial desalinization of sea water, it is to be expected that other volatile solutes may be preferred for use in other operations.

Having fully described my invention, it is to be understood that I do not wish to be limited to the details set forth, but my invention is of the full scope of the appended claims.

I claim:

1. A process for the demineralization of aqueous solutions containing non-volatile salts comprising introducing said salt-containing water into each of two separate but adjacent zones, said zones being separated by a semipermeable membrane; and introducing a volatile solute into a first one of said zones to cause demineralized water to migrate into said first zone, said volatile solute having a molecular size sufficient to prevent substantial amounts thereof from passing through said membrane.

2. The process of claim 1 wherein said salt-containing water is sea water.

3. The process of claim 1 wherein the solution in said first zone is collected and said volatile solute is removed therefrom.

4. The process of claim 3 wherein said volatile solute comprises sulfur dioxide and said removing step comprises heated gas stripping.

5. The process of claim 1 wherein said volatile solute comprises ammonia.

6. A process for demineralizing relatively dilute saline waters including sea waters comprising introducing relatively dilute saline water into each of two sepraate and adjacent zones, said zones being separated by a semipermeable membrane; introducing a volatile solute into a first one of said zones to cause substantially demineralized water to migrate through said membrane into said first zone, said membrane being substantially nonpermeable by said volatile solute and by the salts in said saline waters; and collecting substantially demineralized water from said first zone.

7. The process of claim 6 wherein said membrane comprises carrot root.

8. The process of claim 6 wherein said volatile solutes comprises sulfur dioxide.

9. The process of claim 8 wherein said sulfur dioxide is removed from said demineralized water by heated gas stripping.

10. A process for demineralizing saline waters comprising introducing fresh water into a first one of two separate and adjacent zones, introducing saline water into the second one of said zones, said zones being separated by a semi-permeable membrane; introducing a volatile solute into said first zone to cause substantially demineralized water to migrate through said membrane into said first zone, said membrane being substantially nonpermeable by said volatile solute and by the salts in said saline water; and collecting substantially demineralized water from said first zone.

11. The process of claim 10 wherein said membrane comprises a cellulosic material.

12. The process of claim 11 wherein said membrane comprises carrot root.

13. The process of claim 10 wherein said volatile solute comprises sulfur dioxide.

14. The process of claim 6 wherein said membrane comprises cellulosic material.

References Cited by the Examiner

UNITED STATES PATENTS 3,097,076   7/63   Reid _____ 210—22 X

OTHER REFERENCES

Handbook of Chemistry and Physics, published by Chemical Rubber Publishing Co., Cleveland, Ohio, 39th edition (pp. 616–617 relied upon).

MORRIS O. WOLK, *Primary Examiner.*